United States Patent [19]

Rakow

[11] Patent Number: 5,150,098

[45] Date of Patent: Sep. 22, 1992

[54] BRAKE SIGNALING SYSTEM AND PROCESS

[76] Inventor: Robert Rakow, 5020 S. Lake Shore Dr., #4307-N, Chicago, Ill. 60615

[21] Appl. No.: 613,274

[22] Filed: Nov. 13, 1990

[51] Int. Cl.$^5$ .............................................. B60Q 1/44
[52] U.S. Cl. .................................. 340/479; 340/464; 340/469
[58] Field of Search ............... 340/479, 467, 464, 463, 340/469, 464

[56] References Cited

U.S. PATENT DOCUMENTS

| | | | |
|---|---|---|---|
| 3,787,808 | 1/1974 | Knopf | 340/464 |
| 3,846,749 | 11/1974 | Curry | 340/479 |
| 3,875,559 | 4/1975 | Szekessy | 340/479 |
| 4,726,627 | 2/1988 | Frait et al. | 340/669 |
| 4,918,424 | 4/1990 | Sykora | 340/479 |

FOREIGN PATENT DOCUMENTS 2012484 9/1971 Fed. Rep. of Germany ...... 340/479

Primary Examiner—Jin F. Ng
Assistant Examiner—Dov Popovici
Attorney, Agent, or Firm—Mark I. Feldman

[57] ABSTRACT

A brake signaling safety system and process is provided with a dependable sequential pressure monitoring brake light display to alert others of the relative frequency and amount of braking forces applied during braking of the vehicle. Preferably, the brake signaling safety system has a special circuit to signal a different number of brake lights for different braking forces and vehicle decelerations.

4 Claims, 3 Drawing Sheets

BRAKE SIGNALING SYSTEM AND PROCESS

BACKGROUND OF THE INVENTION

This invention pertains to motor vehicles and, more particularly, to a brake signaling system and method for use with motor vehicles.

Insufficient spacing between vehicles is the cause of one of the most costly and serious types of traffic accidents, the rear end collision. Rough estimates conservatively indicate that it accounts for more that one-third of all traffic accidents and one-half of the resulting injuries. Driving too close to a leading vehicle is the most basic driving error. Tailgating produces the deadliest damage, ranking the number one cause of auto accidents and injuries on the highway. Not only do such accidents result in loss of life and injuries which causes human suffering to persons and their families, but such accidents often require expensive repairs and cause insurance premiums to increase.

Rear end collisions can often be prevented. Generally, such collisions are the direct result of drivers trailing so closely or tailgating, that they cannot stop in time. When the forward vehicle stops quickly or slows down, the driver of the trailing vehicle often fails to appreciate that stopping his vehicle involves numerous factors: e.g., the driver's reflexes, reaction time, age, eyesight, physical condition, awareness of other vehicles, attentiveness and concentration on driving, sobriety, as well as the velocity of the vehicle, condition and grade of the road, weather conditions, visibility, type and weight of the vehicle, operating condition of the vehicle, and especially its tires and brakes. Conditions also vary between daytime and night-time driving and the amount of ambient light available. It is often difficult to quickly determine the minimum safe distance required between cars because of the numerous factors involved.

One safety organization recommends one car length for each 10 miles per hour of speed of the trailing vehicle. Improving a driver's awareness and reaction time is important. For example, providing an improvement of awareness or reaction time of even 1/10th of a second not previously available gives an additional three feet of stopping distance at 20 miles per hour, six feet at 40 miles per hour, and as much as nine feet at 60 miles per hour. This extra distance can be the difference between a safe stop and a rear end collision. Even 10ths of seconds of improvement in awareness or reaction time is of considerable significance.

Significantly, motor vehicle accidents involving rear end collisions comprise about one-third of the total accidents in the United States. Indeed, the severity of this problem prompted the U.S. Government to mandate the use of high-mounted, third brake lights on all post 1985 U.S. delivered automobiles. Through various tests, it has been found that such central high-mounted brake lights provide greater and improved recognition factors to the driver of the trailing vehicle and improves the reaction time of the driver by about 1/10th of a second in a braking condition, i.e. where the leading vehicle has activated its brakes.

Over the years, various prior art vehicle lighting and signaling devices, and methods of their construction and use, have been suggested. For example, Caine, U.S. Pat. No. 4,808,968, discloses a warning and brake light arrangement such that an amber warning light is associated with a high-mounted brake light with the warning light being illuminated continuously except when the braking system is activated. With brake light illumination, the warning light is extinguished. This lighting arrangement is not very effective, since the warning light only communicates when the braking system is inactive.

Caine, U.S. Pat. No. 4,600,913 discloses a safe distance signal light, such as with four illuminated areas located in four quadrants of a rectangular grid system. As the distance between vehicles increase, various sized opaque spaces between the quadrants progressively disappear, and less lights are seen.

Kobayashi, Japanese patent application no. 63-17140, discloses a brake light system control circuit which provides a variable voltage output to the brake light in relation to the movement of a sliding resistor attached to the brake pedal coupler rod. This system, although it monitors brake pedal travel distance, does not monitor activity within the hydraulic braking system. Since a monitoring device is only as accurate as the system it monitors, this system can provide faulty output associated with wear in the brake system, e.g., linkage and brake shoe/pad wear, etc., which would require frequent and inconvenient recalibration. Furthermore, the output of the system, via a variable intensity brake light, can create difficulties regarding perception of the light when other variables are considered, e.g., changes in ambient environmental light, use in different automobiles, etc. and, therefore, standardization would seem to be difficult.

Murata, Japanese patent application no. 63-17141, discloses a message display device which provides various messages initiated by the operator, or by sensors in the automobile, as to the operator's intentions or activity within the automobile, e.g., turning, gear changing, braking, etc. The device is not specific to the braking system, nor does it provide the type of data which is given by the present invention.

Gabaldon, U.S. Pat. No. 4,758,931 discloses a vehicle light system which incorporates a display of various lights that signal different operations of the vehicle, e.g., turning, stopping, backing up, etc. This system is not specific to the braking system. Furthermore, Gabaldon only provides "on-off" information regarding braking activity.

These prior art vehicle lighting and signaling devices, and methods, have met with varying degrees of success, but generally do not achieve the advantages of the present invention. Furthermore, while these prior art patents and foreign patent applications, disclose various types of rear end, lighting systems and methods of their construction, none of them, whether taken singularly or in combination, discloses the specific details, structural elements, and process steps of the present invention as specified in the claims of this patent application.

It is, therefore, desirable to provide an improved brake signaling system and process which overcomes most, if not all of these problems, to help decrease accidents and increases safety of the driver and passengers.

SUMMARY OF THE INVENTION

An improved brake signaling system and process are provided which are effective, efficient and enhance the safety of the vehicle, driver, and passengers. Desirably, the novel brake signaling system and process help decrease auto traffic accidents by alerting and providing important braking information about the magnitude, intensity and frequency of the braking forces and pressures applied during braking to slow down, decelerate, and stop the vehicle.

The novel brake signaling system can include an attractive aesthetic display of brake lights (signal lamps), preferably a panel of at least four red lights, most preferably at least twelve red lights, which are mounted on the rearward portion of the vehicle's rear window or exterior. Special illuminating and signaling electric circuitry are provided to illuminate and signal a different number of brake lights when the brake is activated (e.g. the brake pedal is being depressed) and different brake forces are applied to the brake by the foot (shoe) of the vehicle operator (driver). In the preferred form, the signaling circuitry is operatively connected to a hydraulic braking system so as to produce different signals and activate a different number of brake lights in responsive to different hydraulic braking pressures exerted on the braking system by the brake pedal.

In the illustrative embodiment, the signaling circuitry includes a pressure transducer, low-noise amplifier, comparators, and current amplifiers. An illuminating and intensity switch can be provided to vary the intensity of the brake lights (lamps) for daytime and nighttime driving. An emergency switch and ramp generator can also be provided to generate a sawtooth waveform and sequentially and intermittently flash the brake lights, such as during an emergency.

The novel brake signaling system and process enable drivers and passengers of other cars driving behind the operator's vehicle, to readily observe and view different number and amount of brake lights when different brake forces are applied by the front (lead) vehicle. The novel brake signaling system and process also indicate the magnitude, intensity, or rate of the brake forces and deceleration of the front vehicle and signal when the operator of the front vehicle is applying the brake quicker, firmer, slower, softly, or not at all.

In the preferred form, the greater the braking force and pressure, the greater the number of brake lights that are activated and illuminated. The brake display lights are activated upon application of the brake pressure. Preferably, the panel of lights are sequentially illuminated as progressively greater braking force is applied. The number of illuminated brake lights are an indication of the distance and time required to stop.

Advantageously, the novel brake signaling system and process can increase the driver's visual perception and mental awareness of the dynamics and frequency of braking so that there is improved reaction (perception) time to stop the vehicle and avoid an accident.

Desirably, the invention provides an automotive vehicle safety device, a brake light display, and process that provides a real time and dynamic portrayal of the level of activation of the hydraulic braking system. The novel brake signaling system and process allows following motorists to more accurately determine the amount of braking force which is being applied in the lead vehicle thereby assisting these motorists in determining the appropriate amount of braking force needed to maintain control and safety relative to the preceding motorist.

The brake light display and system include a series of lamps which are illuminated sequentially in direct proportion to the pressure exerted by the brake pedal on the hydraulic braking system. Only a few lights are illuminated with low or slight braking pressure. More lights are illuminated with moderate braking pressure. All lights are illuminated with maximum braking pressure. The brake light display can be connected to the two rear taillights as well as a high-mounted conventional third brake brake light, if desired.

The present brake light display provides an added dimension of data over that available in prior art systems, which typically only provide "on-off" information. The present invention not only senses and indicates whether the braking system is activated, but also senses and indicates the degree to which the braking system is activated, e.g. slight braking, moderate braking, greater braking, maximum braking. This dynamic portrayal of the activity within the braking system provides observing motorists with more significant data about the deceleration rate of the lead (front) vehicle, helps observing motorists more accurately and quickly determine a safe intervehicular space behind the lead vehicle, and improves observing motorists' capability of avoiding a collision. The brake light display is especially useful for high-speed, congested expressway driving where time, distance, reaction time, deceleration rate, road surface conditions, e.g. wet or icy pavement, etc., are critical.

The novel brake light display could also be incorporated with an emergency flasher system in order to enhance the visibility of the vehicle, such as during emergencies or deliveries, by the sequential growth and decay of the light display.

A more detailed explanation of the invention is provided in the following description and claims taken in conjunction with the accompanying drawings.

DETAILED DESCRIPTION OF THE PREFERRED EMBODIMENTS

Figure 1:
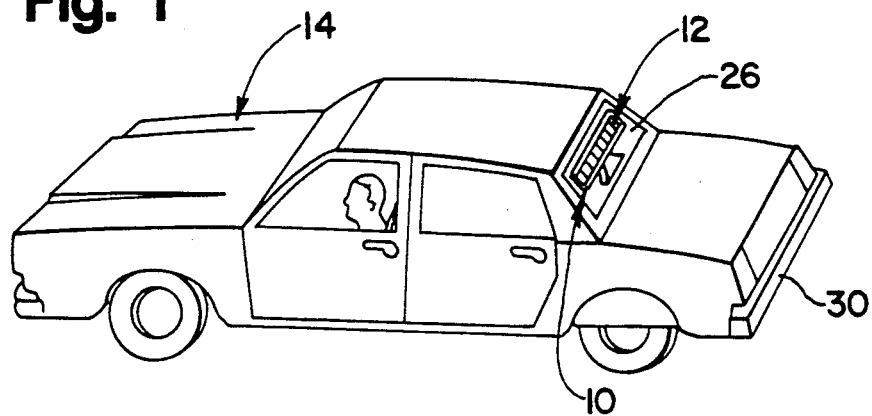
FIG. 1 is a perspective view of a vehicle with a brake signaling system in accordance with principles of the present invention.

A brake signaling safety system 10 (FIG. 1) provides a sequential pressure monitoring brake light display 12 for use in motor vehicles 14, such as automobiles, buses, vans, trucks, trailers, and motorcycles. The brake light display prominently, reliably, and effectively displays braking information, such as the relative magnitude, intensity and rate of braking (brake forces) and deceleration of the vehicle so that the brake light display can be readily seen by other vehicles to help prevent rear end collisions and enhance vehicle safety.

Figure 2:
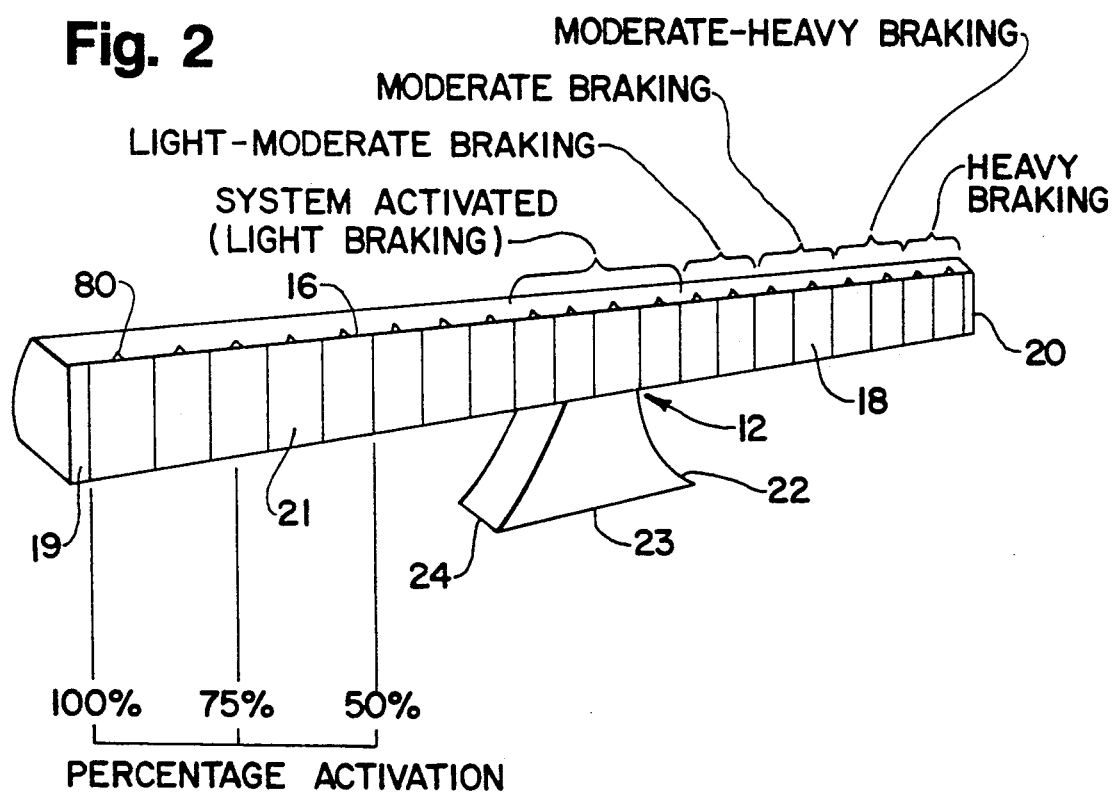
FIG. 2 is a perspective view of a panel of brake display lights for mounting on the vehicle.

As shown in FIG. 2, the brake light display 12 can comprise a panel 16 with an array, set, or series of at least four, and most preferably at least twelve, brake signal lights or display lamps 18 mounted on the motor vehicle and facing rearwardly. In the illustrative embodiment, there are twenty-two brake lights aligned in registration with each other including two terminal end brake lights 19 and 20 and intermediate similar size braking information lights 21. The brake lights are preferably tinted or colored red, although other colors can be used. The panel 16 can be mounted on an arcuate pedestal 22 with concave downwardly diverging sides and a rectangular base 23 with a planar or flat bottom 24. The panel display 12 can be positioned and mounted upwardly in the rear window 26 (FIG. 1) of the vehicle 14. Alternatively, the display panel 12 can be mounted on the vehicle's exterior above the trunk, in proximity to the rear window, or adjacent the rear (back) bumper 30 and taillights. The light display 12 or a duplicate or miniature light display can also be mounted on the dashboard for viewing by the vehicle driver and passengers.

Figure 3:
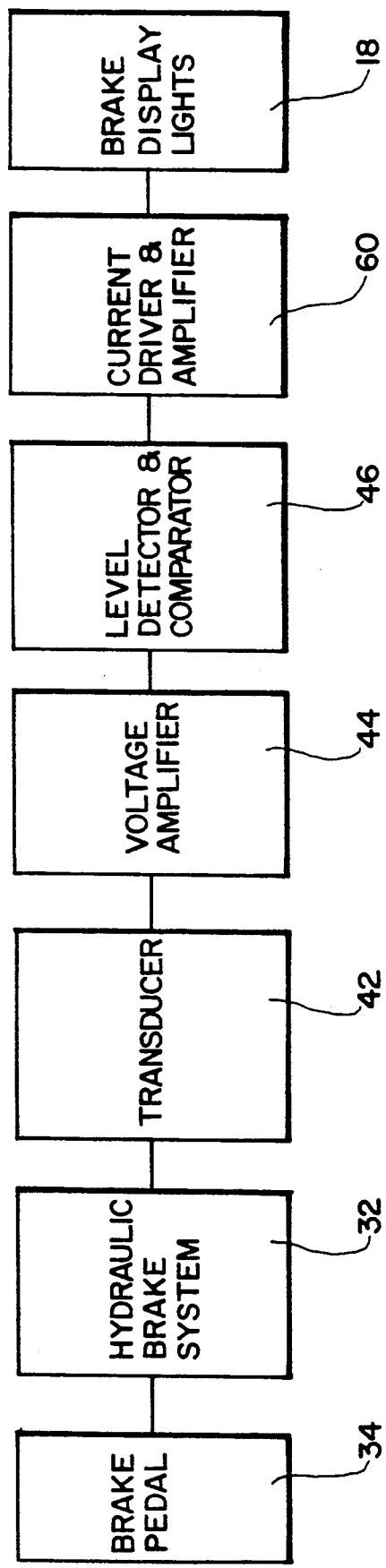
FIG. 3 is a block flow diagram of the sequential pressure monitoring brake light display.

The safety system of the vehicle has a hydraulic braking (brake) system 32 (FIG. 3) to decelerate, slow down, and stop the vehicle. The braking system is activated by a brake pedal 34 and connected to the brake shoes about the rim of the wheels. The brake pedal 34 is typically positioned above the floor of the vehicle below the steering wheel and is depressed (activated) by the foot (shoe) of the vehicle driver or operator. The brake pedal (brake) 34 is moveable from an upwardly normally inactive (unactivated) position to a downward depressed braking position and vice versa. The brake pedal 34 exerts a hydraulic pressure on the hydraulic brake system. Braking speed and movement of the pedal and hydraulic brake pressure and dependent upon the magnitude (intensity) and rate of the braking forces applied to the brake pedal.

In accordance with this invention, in order to inform other vehicles behind the subject lead (front) vehicle of the occurrence, relative amount and speed (rate) of braking (braking forces and pressures) and deceleration (of the subject vehicle), different number of brake lights 18 are activated, signaled, and illuminated in response to different magnitude (intensity) and rate (speed) of the braking forces (strength) applied to the brake (brake pedal). To this end, an illuminating and signaling electric circuit 40 (FIG. 4) is operatively connected to the hydraulic brake system 32.

Circuit

Figure 4:
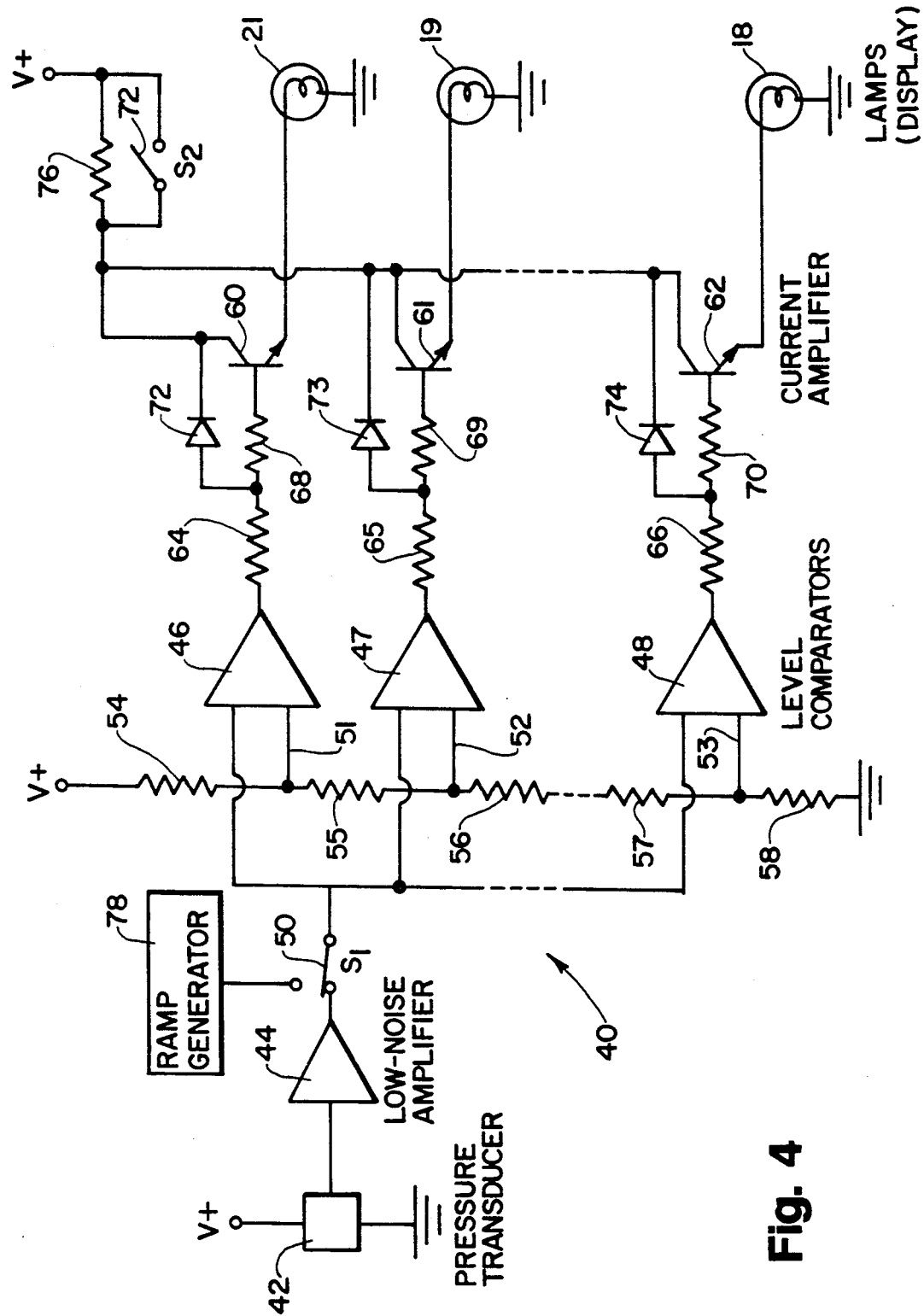
FIG. 4 is an illuminating and signaling circuit diagram for controlling the brake display lights.

As best shown in FIG. 4, the illuminating and signaling electric circuit 40 has a pressure transducer 42, coupled to the hydraulic brake system, to sense hydraulic brake (braking) pressures in the hydraulic brake system and produce a voltage. A low-noise amplifier 44 is connected to the pressure transducer 42 to amplify the voltage generated by the transducer 42. A parallel set of level comparators and detectors 46, 47 and 48 are connected through a normally closed emergency switch 50 to the low-noise amplifier 44 and are connected by lines 51, 52, and 53 to resistors 54-58. The level comparators 46, 47, and 48 compare the amplified input voltage from the pressure transducer 42 with the reference voltage levels in resistors 54-58 and generate output current when the reference voltage levels are exceeded by the amplified input voltage. The output current is amplified by current drivers and amplifiers 60, 61, and/or 62 to activate brake display (signal) lights 18-21. In the preferred embodiment, the output of each level comparator 46, 47, and 48 has a series of resistors, including a trailing upstream (left) resistor 64, 65, or 66 and a leading downstream (right) resistor 68, 69 or 70. The leading downstream resistor is connected and coupled in parallel to a diode 72, 73 or 74 and is directly connected in series to a current amplifier 60, 61 or 62 comprising a transistor or triode. Each of the brake lights (display lamps) can be connected to a separate level comparator, current amplifier, diode, trailing and leading resistor.

A normally open switch 72 is connected in parallel to a resistor 76 and is connected to the current amplifiers 60, 61, and 62 to regulate and vary, or turn on and off, the illumination and intensity of the brake lights, such as for daytime and nighttime driving.

A ramp generator 78 is provided to generate a sawtooth waveform. Emergency switch 50, when opened (triggered), activates and connects to the ramp generator 78 to sequentially and intermittently flash the brake lights 18, such as during an emergency.

The pressure transducer 42 is used to detect the pressure in the brake fluid and provide a voltage output in the millivolt range which is a function of the fluid pressure. The voltage has to be amplified before it can be used to drive the lamps 18-21. This is achieved by the low-noise amplifier 44, which delivers a signal on the order of a few volts. The level comparators 46, 47 and 48 then compare this voltage with a number of reference voltage levels in an ascending order. The output of a level comparator will register either a high or a low output. Those with a high output will activate the current amplifier to light up the appropriate lamps. The display lights up in a sequential manner.

When the switch S1 (50) is thrown towards the ramp generator 78, which generates sawtooth waves, the lamps 18-21 will be scanned repeatedly, indicating an emergency. Intensity of the lamp is controlled by the switch S2 (72), which is normally closed in the daytime.

The transducer 42 is essentially a device that receives energy from one system and retransmits it in another form to another system. In this case, the transducer 42 receives energy from the hydraulic brake system and converts it into electrical energy that would be transmitted to the electrical system. The transducer can be placed in series with the master brake cylinder to access the pressure within the hydraulic brake system and in turn, retransmit this pressure as electrical energy. The transducer can be calibrated for even greater accuracy.

In the preferred embodiment, the brake light is elongated and comprises a series of individual lamps 18-21 as shown in FIG. 2. The individual lamps are connected such that more lamps are illuminated in proportion to the increasing braking pressure exerted upon the hydraulic brake system as braking occurs. If desired, a high-mounted, third brake light similar to the current brake light, which is mandated in all post 1985 U.S. delivered vehicles, could be used.

The brake signaling system has circuitry 40 (FIG. 4) that when the lights are activated, provide an illumination level comparable to high mounted brake lights. In the circuitry 40, as greater pressure is applied to the hydraulic brake system, the lamps 18-21 sequentially light in proportion to the increase in braking pressure. Desirably, the circuitry permits a fraction of a second delay in the growth or decay of the illumination, to provide a smooth sequential display.

Activation of the dimmer switch 72 (FIG. 4) can reduce the illumination level at night and, thereby, provides a higher level of illumination during the day light. The ramp generator 78 and emergency switch 50 provide an emergency flasher system for a smooth sequential display of the growth and decay of the illumination of the lamps.

The upper border of the lens can have small tabs 80 (FIG. 2) adjacent to each lamp chamber. The tabs 80 can extend above the housing of the light a fraction of an inch. When the lamps 18-21 are activated in the brake light a portion of the illumination is conducted into the tabs 80 to allow the driver to determine if the individual lamps are functioning properly. Specifically, the tabs 80 located on the lens of the brake light, adjacent to each lamp chamber, provide the operator of the vehicle with readily observable information as to the functional status of each lamp. i.e. whether any lamp is burned out, in the brake light system.

The brake light display 12 (FIG. 2) has terminal lamps 19 and 20 (FIG. 2) at the ends of the panel 16 of brake lights which are activated at night to provide awareness as to the complete field of lamps available to be illuminated as the brake hydraulic system goes through various levels of activation.

TABLE 1

For best results. the circuit of the brake signaling device and light display have the following components.

| Component | Value or Identification |
| --- | --- |
| low noise amplifier 44 | LM108 or equivalent |
| resistor 54 | 10K |
| resistors 55–58 | 4.7K each |
| level comparators | MC1741 or equivalent |
| resistors 64–66 | 1.2K each |
| resistors 68–70 | 1K each |
| diodes 72–74 | 1N4001 or equivalent |
| current amplifier | MPSU01 or equivalent |
| resistor 76 | 3.3 ohms |

Brakes

Use of hydraulic shoe type brakes comprises the following operations: when the brake pedal is depressed, a piston in the main cylinder is moved and produces a pressure through the brake system. This pressure forces the two small pistons in the wheel cylinders apart. As a result, the shoes are thrust against the brake drum. The kinetic energy of the vehicle is transformed into heat energy by the friction which occurs at the brake linings. This causes heating of the brake drum. In order quickly to dissipate as much heat as possible, the brake drums have a large external surface area and are usually cooled by ambient air flow. If the brake drum becomes too hot, it will expand excessively, and then the brake shoes will not press tightly against the inside of the drum. In addition, the braking efficiency of the brake lining diminishes at elevated temperature, as heat reduces the frictional force developed. Poor heat dissipation greatly reduces the efficiency of the brake.

The central component of the brake system is the master cylinder. When the brake pedal is depressed, the piston reciprocates (moves) and produces a pressure in the chamber behind it. This pressure is transmitted by the hydraulic fluid through the pipes to the wheel cylinders. To equalize any differences of pressure in the system, a check valve can be placed between the pressure chamber and the pipes. The master cylinder assures uniform filling when the piston is stopped so that hydraulic fluid flows from the reserve tank through the compensating post into the pressure chamber. The space behind the back of the piston can be filled with fluid through an auxiliary port to prevent air being drawn in when the piston returns to its initial position. One end of the master cylinder can have a stop-light switch in which the hydraulic pressure moves a small piston which actuates the electrical contact that switches on the light.

There are various types of internal-expanding shoe-type brakes. In Duplex brakes, each shoe has its own wheel cylinder which acts in only one direction — pressing one shoe against the drum, while the other shoe serves as a support for thrusting against. In Duplex brakes, the shoes are mounted so that when the vehicle is traveling forward, the brake drum tends to carry each shoe around with it in the direction away from the pivot point of the shoe. This makes for efficient braking by self-servo action.

Dual circuit hydraulic systems comprise a tandem master cylinder which contains two pistons that are actuated by the brake pedal. The front piston transmits its force to the rear one, so that hydraulic pressure is developed in two circuits. In a two circuit braking system, if an oil pipe in one hydraulic circuit fractures, the second hydraulic circuit will still continue to function.

Many motor vehicle use disc brakes. In partial disc brake systems, the brake disc is gripped pincer-wise between two circular or kidney-shaped brake pads fitted with friction linings. The large area of the disc provides excellent dissipation of the heat generated during braking. Two circuit hydraulic systems, when applied to disc brakes of this kind, do not separately serve the front and the rear wheels respectively; instead, each circuit serves all four wheels. For this purpose the brake disc of each of the wheels is provided with four hydraulic brake cylinders.

In full disc brakes systems, fixed pads with friction linings engage both sides of a rotating casing. Self-servo energizing action can be attained with steel balls which are placed upon inclined faces of sockets, when the two brake discs (one fixed and one moving) rotate relative to each other. This arrangement forces the discs apart, causing them to be pressed more firmly against the casing. Wear of the friction linings necessitates an even greater amount of displacement of the discs relative to each other. For this reason disc brakes having a high degree of self-servo action are particularly sensitive to lining wear.

Operation

During operation of the motor vehicle when the braking (brake) system 32 (FIG. 3) is activated by pressure on the brake pedal 34, brake pressure is detected in the hydraulic system by the transducer 42. The transducer 42 converts the hydraulic pressure into electrical energy which is transmitted to the brake lights 18. The brake lights respond to this energy by the sequential activation of a number of lamps that illuminate in direct proportion to the pressure asserted in the hydraulic brake system. Therefore, a real time display is displayed via a sequence of lamps which would communicate to motorists behind or rearwardly of the subject vehicle to prominently display and signal the braking force (pressure) and rate of deceleration. Such information help make motorists behind the subject vehicle more aware and better informed of the velocity and deceleration of the subject vehicle and can improve their reaction time for a safer response.

The initial activation of the brake light system with slight braking force and pressure, would illuminate a central portion of the light, such as approximately 4 inches in length. As braking pressure is increased, e.g. light-moderate to moderate-heavy, to heavy and maximum braking, the lighting display would be illuminated, lamp by lamp, in direct proportion to the hydraulic braking pressure exerted in the brake system. A smooth continuous sequential display occurs in proportion to the increase (growth) or decrease (decay) of pressure in the hydraulic braking system.

More specifically, a brake signaling process is provided for use in motor vehicles in which the brake pedal 34 of a motor vehicle is at least partially depressed with a first braking force by the vehicle operator to slow down or stop the vehicle in a first amount of time. The brake pedal 34 of the vehicle can be at least partially depressed with a different braking force by the vehicle operator to slow down or stop the vehicle in a different amount of time. As shown in FIG. 2, for enhanced vehicle safety during braking, pairs of brake lights 18 on the vehicle are sequentially and progressively signaled and illuminated with different braking forces activating and signaling a different pair of brake lights 21 than the first braking force so that an observer positioned behind the vehicle can see a different amount of lights 18 when different braking forces are applied by an operator of the vehicle. In the preferred embodiment of FIG. 2, the set of brake lights comprises a linear panel 12 of at least four brake lights including a central pair of brake lights in a central portion of the panel which are activated during light braking, with at least four of the brake lights 18, 19, 20 and 21 being aligned in a substantially straight line. As shown in FIG. 2, the brake lights are progressively lit from light braking to light-moderate braking, to moderate braking, to moderate-heavy braking, to heavy braking, in a diverging pattern outwardly from the central pair of brake lights with 50%, to 70%, to 100% activation of the brake lights, as greater braking force is applied to the brake pedal.

During nighttime use, the terminal lights 19 and 20 (FIG. 2) signal and convey the extent of the sequential display that is illuminated in relation to the amount of the display available for illumination, and thereby the proportion of the braking that is occurring at a time when the ambient light is low. A dimmer device (switch 72) (FIG. 4) can be activated to its nighttime position to reduce the level of illumination. A higher level of illumination of the brake light can occur during daytime use by returning the dimmer switch 72 to its daytime position, to enhance visibility of the light display. During nighttime use when this higher level of illumination would not be needed, the dimmer device 72 would be switched to its nighttime position to reduce the level of illumination. The emergency flasher system can be displayed by the sequential brake light both in the growth phase and in the decay phase by activating the emergency switch 50 to enhance visibility of the light display.

Advantageously, the brake signaling system of the invention expands the data that is available from a brake light system in that existent systems convey only on-off data. This invention indicates not only when the brake system is activated, but also the degree to which the system is activated. This information in turn provides data as to how rapidly the vehicle is decelerating. The brake signaling system accurately differentiates and displays levels of activation of the hydraulic braking system from initial activation or "riding the brakes" all the way to maximal, heavy braking. Once the hydraulic braking system is activated by the brake pedal, no other conscious effort is required of the motorist to convey data regarding the dynamics that are occurring in the hydraulic braking system.

The system as displayed has inherent and intrinsic meaning not absolutely requiring standardization in that the conveyed stimuli attract attention through several modes, i.e., the expanding display provides an increasing amount of stimulus available for perception; the increasing amount of red light displayed has an inherent meaning; and the movement in the display vis a vis the growth or decay of the display stimulates attention.

The brake signaling system of the invention provides a real time dynamic portrayal of the level of activation of the hydraulic braking system to assist the following motorist in determining the appropriate amount of braking force that is needed to maintain control and safety relative to the preceding lead or front motorist. Through communication of more relevant data to the following motorist regarding the braking activity in the leading vehicle, a rear end collision can be avoided or minimized. Desirably, the brake signaling system is well suited for safer high-speed congested expressway driving where time, distance, deceleration rate and reaction time are critical.

Among the many other advantages of the novel brake signaling system and process are:
1. Outstanding display of braking information.
2. Superior signaling of the magnitude, intensity, frequency, and rate of braking.
3. Better communication of vehicle operating conditions.
4. Greater vehicle safety.
5. Decreases rear-end collisions.
6. Easy to see.
7. Simple to use.
8. Dependable.
9. Convenient.
10. Attractive.
11. Efficient.
12. Effective.

Although embodiments of the invention have been shown and described, it is to be understood that various modifications and substitutions, as well as rearrangements of parts, components, equipment, and process steps, can be made by those skilled in the art without departing from the novel spirit and scope of this invention.

What is claimed is:

1. A brake signaling system for use in motor vehicles, comprising:

a brake display comprising a lighting set of at least four brake lights mounted on a motor vehicle and facing rearwardly, said lighting set of at least four brake lights including at least two red lights;

a hydraulic brake system for decelerating and stopping said vehicle;

a brake pedal connected to said hydraulic brake system and exerting hydraulic braking pressures on said hydraulic brake system, said brake pedal being moveable from an upward inactive position to a downward depressed braking position by braking forces applied by a foot of an operator of the vehicle, said brake pedal being responsive to different braking forces and rates;

illuminating and signaling means operatively connected to said hydraulic brake system for sequentially and progressively illuminating and signaling different pairs of said brake lights when different braking forces are applied to said brake pedal, said illuminating and signaling means including pressure transducer means for sensing said hydraulic braking pressures in said hydraulic brake system and for producing a voltage;

voltage amplifier means comprising a low-noise amplifier connected to said pressure transducer means for amplifying said voltage produced from said pressure transducer means;

level detector and comparator means comprising a series of five reference voltage resistors and three level comparators connected to said low-noise amplifier for comparing said amplified voltage with reference voltage levels, and generating currents when said reference voltage levels are exceeded by said amplified voltage from said low-noise amplifier; and current driver and amplifying means comprising three current amplifiers connected to said lighting set of at least four brake lights and three parallel sets of current driving resistors and diodes connected to and between said current amplifiers and said level comparators, each of said parallel sets of current driving resistors and diodes comprising two current driving resistors connected in series to one of said current amplifiers and one of said level comparators including a first leading current driving resistor positioned adjacent and connected to said one of said current amplifiers and a second trailing current driving resistor positioned adjacent and connected to said one of said level comparators and a current driving diode connected in parallel to said first leading resistor, said current driver and amplifying means amplifying said current and activating said brake lights when said brake pedal is depressed so that different pairs of said brake lights are activated and illuminated when different braking forces are applied to said brake pedal.

2. A brake signaling system in accordance with claim 1 including switching means connected to said three current amplifiers for varying the intensity of said brake lights for daytime and nighttime driving, said switching means comprising a light intensity-varying switch connected in parallel to a switching resistor.

3. A brake signaling system in accordance with claim 1 including:

a ramp generator for generating a sawtooth waveform, emergency switching means connected to said ramp generator and said low-noise amplifier for sequentially and intermittently flashing said brake lights during an emergency, and wherein said lighting set comprises from four to twenty-two of said brake lights.

4. A brake signaling system in accordance with claim 1 wherein said lighting set includes at least twelve brake lights.

* * * * *